United States Patent [19]

Kita

[11] 4,220,737
[45] Sep. 2, 1980

[54] PAINT COMPOSITION

[75] Inventor: Ryuji Kita, Yokohama, Japan

[73] Assignee: Nippon Zion Co. Ltd., Tokyo, Japan

[21] Appl. No.: 935,157

[22] Filed: Aug. 21, 1978

[30] Foreign Application Priority Data

Aug. 22, 1977 [JP] Japan .................. 52-100281

[51] Int. Cl.$^2$ .................. C08L 11/00; C08L 15/02; C08L 23/28
[52] U.S. Cl. .................. 525/214; 260/3.5; 260/22 XA; 260/23.7 H; 260/23.7 C; 525/160; 525/169; 525/215; 525/216
[58] Field of Search .................. 260/889, 890, 3.5, 888; 525/214, 215, 216

[56] References Cited

U.S. PATENT DOCUMENTS

| | | | |
|---|---|---|---|
| 3,351,677 | 11/1967 | Barton et al. | 260/889 |
| 3,891,725 | 6/1975 | Klever | 260/889 |
| 3,919,130 | 11/1975 | Cohen | 260/889 |

*Primary Examiner*—J. Ziegler
*Attorney, Agent, or Firm*—Sherman & Shalloway

[57] ABSTRACT

An air drying paint composition comprising a chlorinated polymer selected from the group consisting of chlorinated polydiolefin rubbers and chlorinated polyolefins as at least one ingredient of a binder, said composition further comprising 5 to 100 parts by weight, per 100 parts by weight of the chlorinated polymer, of a cyclopentadiene resin having a softening point of 50° to 160° C. prepared by heat polymerization of 50 to 100% by weight of a cyclopentadiene monomer and 50 to 0% by weight of a comonomer copolymerizable with it.

8 Claims, No Drawings

PAINT COMPOSITION

This invention relates to a novel paint composition. More specifically, it relates to a paint composition having improved adhesion, flexibility, impact strength and alkali resistance which is prepared by incorporating a cyclopentadiene resin into an air drying paint comprising a chlorinated polyolefin rubber or a chlorinated polyolefin as at least one ingredient of a binder.

Chlorinated low-molecular-weight polyisoprene rubber, chlorinated low-molecular-weight polybutadiene rubber, chlorinated polyethylene and chlorinated polypropylene have been used widely as binders for air drying paints. These chlorinated polymers are obtained by chlorinating masticated natural rubber, masticated synthetic cis-1,4-polyisoprene rubber, masticated polybutadiene rubber, polyethylene resin or polypropylene resin. They are chemically stable with little susceptibility to attack by acids and alkalies. Films of these polymers have low permeability to water or a water vapor. These chlorinated polymers are rapid drying, and give very hard coated films. However, when these chlorinated polymers are used alone, they have the defect of being brittle and having poor adhesion to the substrate. The use of plasticizers is widespread in order to take advantage of the desirable characteristics of the chlorinated polymers. Examples of the plasticizers are phthalate esters or chlorinated paraffin. Use of the plasticizers can bring about an improvement of flexibility and adhesion to the substrate, but adversely affects the rapid drying property, hardness and chemical stability of the resulting coating.

Chlorinated polymers are also used as improvers for alkyd resin paints or oil varnish paints in order to take advantage of their superior properties such as rapid drying property, hardness, chemical resistance and low water permeability. Addition of a large quantity of such a chlorinated polymer causes an increase in the cost of production and in the viscosity of the resulting paint, and incompatibility with zinc-containing and aluminum-containing pigments.

One object of this invention is to improve the adhesion strength, flexibility and impact strength of coated films without impairing the characteristic water resistance, corrosion resistance and impact strength of paints having a chlorinated polymer as a binder (vehicle).

Another object of the invention is to provide an air drying paint composition having improved adhesion, flexibility, impact strength and alkali resistance and containing a chlorinated polymer as at least one ingredient of a binder.

Still another object of this invention is to provide a paint composition having superior water resistance, corrosion resistance, acid resistance and hardness and containing a chlorinated polymer as one ingredient of a binder.

These objects of the invention can be achieved by incorporating 5 to 100 parts by weight, per 100 parts by weight of the chlorinated polymer, of a cyclopentadiene resin having a softening point of 50° to 160° C. obtained by heat polymerization into an air drying paint containing as at least one ingredient of a binder a chlorinated polymer selected from the group consisting of chlorinated polydiolefin rubbers and chlorinated polyolefins, and if desired adding conventional compounding agents such as pigments, plasticizers, solvents, stabilizers and dispersants.

The cyclopentadiene resin used in this invention, is prepared by polymerizing 50 to 100% by weight, preferably 60 to 100% by weight, of a cyclopentadiene monomer and 50 to 0% by weight, preferably 40 to 0% by weight, of a comonomer copolymerizable with the aforesaid monomer, such as a diolefinic monomer, a monolefinic monomer or a polar vinyl monomer in the absence of a non-radical catalyst such as a cationic catalyst with or without an inert hydrocarbon solvent such as benzene, toluene or xylene at 200° to 300° C., preferably 250° to 280° C., for a period of 0.5 to 20 hours, preferably 1 to 10 hours, in an autoclave, and removing low-boiling products such as the unreacted materials by distillation or other usual means of polymer purification. The cyclopentadiene resin has a softening point of 50° to 160° C., preferably 80° to 140° C., and a Gardner color number of preferably not more than 10. A product obtained by hydrogenating the cyclopentadiene resin in a customary manner to reduce its color and improve its weatherability, and a product obtained by modifying the cyclopentadiene resin with an ethylenically unsaturated carboxylic compound typified by maleic anhydride can also be used as the cyclopentadiene resin in this invention.

If the resin has a cyclopentadiene monomer content of less than 50% by weight, it does not have sufficient compatibility with the chlorinated polymer, but has inferior ability to improve the drying property of the paint, and the hardness, flexibility and water resistance of the coated film. Thus, it is unsuitable as an additive for paints. Cyclopentadiene resins having a softening point of more than 160° C. have poor compatibility with chlorinated polymers.

The term "cyclopentadiene monomer", as used in the present invention denote cyclopentadiene and its derivatives. It includes cyclopentadiene, cyclopentadienes substituted with a lower alkyl group such as methyl or ethyl, and lower Diels-Alder adducts of cyclopentadiene and its derivatives such as dimers, trimers or codimers. Since, cyclopentadiene is present as dicyclopentadiene stably at room temperature, cyclopentadiene and dicyclopentadiene are usually handled in quite the same manner.

The diolefinic monomer means not only conjugated diene compounds such as 1,3-butadiene, isoprene and 1,3-pentadiene, but also non-conjugated diene compounds such as 1,4-pentadiene and 1,5-hexadiene.

Examples of the monolefinic monomer are styrene, α-methylstyrene, ethylene, propylene, butene, and pentene.

The polar monolefinic monomer means a vinyl monomer having a polar group, and includes, for example, organic unsaturated cyano compounds such as acrylonitrile and methacrylonitrile; lower fatty acid esters of unsaturated alcohols such as vinyl acetate, vinyl propionate, allyl acetate, methallyl acetate, allyl propionate and methallyl propionate; unsaturated carboxylic acids such as acrylic acid and methacrylic acid; esters formed between the aforesaid carboxylic acids and lower alcohols such as methyl alcohol, ethyl alcohol, butyl alcohol, glycide and ethylene glycol; unsaturated aldehydes such as acrolein and methacrolein; monohydric or polyhydric unsaturated alcohols such as allyl alcohol, crotyl alcohol, 1,4-butenediol and 3-hexane-2,5-diol; and unsaturated ethers such as allyl glycidyl ether.

The chlorinated polymer used in this invention is generally used as a binder for air drying paint compositions, and is obtained by chlorinating in a customary manner masticated natural rubber, masticated synthetic cis-1,4-polyisoprene rubber, low-molecular-weight synthetic cis-1,4-polyisoprene rubber, masticated polybutadiene rubber, polyethylene, or polypropylene, for example. These chlorinated polymers have a chlorine content of at least 55% by weight, preferably at least 60% by weight, and are soluble in toluene. They should have a viscosity, determined for its toluene solution at 25° C. in a concentration of 40% by weight, of 20 to 10,000 centipoises. One chlorinated polymer which meets these requirements is chlorinated masticated natural rubber having a molecular weight of 500 to 100,000.

It is essential in this invention that the aforesaid chlorinated polymer be contained as at least one ingredient of a binder. Usually, the amount of the chlorinated polymer is at least 20% by weight, preferably at least 30% by weight, based on the entire binder. A natural drying oil or an alkyd resin is, for example, used as another ingredient of the binder.

The cyclopentadiene resin should be added in an amount of 5 to 100 parts by weight, preferably 10 to 50 parts by weight, per 100 parts by weight of the chlorinated polymer. When the amount of the cyclopentadiene resin is too small, the improvement of the adhesion, flexibility, impact strength and alkali resistance of the coated film is not appreciably achieved. If it is too large, the drying speed of the coated film or its hardness are reduced.

The paint composition of this invention is prepared by dissolving the chlorinated polymer and cyclopentadiene resin in a paint-forming solvent such as toluene, xylene and solvent naphtha, and if desired, further adding another binder ingredient such as an alkyd resin, natural drying oil, amino resin or acrylic resin, a pigment such as titanium oxide, red lead, red iron oxide, zinc powder, calcium carbonate, or talc, a plasticizer such as dioctyl phthalate, dioctyl sebacate or chlorinated paraffin, and a stabilizer such as phenyl glycidyl ether or epoxidized soybean oil.

The composition is coated on the adherend by ordinary methods such as brush coating or spray coating, and allowed to stand at room temperature. If it is necessary to shorten the drying time, the coating is cured by forcible drying at a temperature of up to 100° C. Thus, a coated film can be formed which has superior hardness, adhesion, flexibility, impact strength, gloss, water resistance, corrosion resistance and chemical resistance.

The following Examples further illustrate the present invention. In these examples, all parts and percentages are by weight unless otherwise specified.

EXAMPLE 1

A monomeric mixture consisting of 70 parts of dicyclopentadiene and 30 parts of isoprene was heat polymerized at 260° C. for 3 hours in the presence of xylene to afford a cyclopentadiene resin having a softening point of 125° C. In accordance with the following compounding recipe, the resin was compounded with chlorinated rubber (chlorinated masticated natural rubber having a chlorine content of 65% by weight and a viscosity, determined for a toluene solution in a concentration of 40% at 25° C., of 300 centipoises) and other ingredients indicated to prepare a paint composition.

The composition was kneaded thoroughly in a ball mill, and coated on a degreased mild steel plate by a bar coater including piano wires having a diameter of 1 mm. The coating was dried for one week in an atmosphere kept at 25° C. and RH 60% to form a cured coating. The properties of the cured coating were measured in accordance with JIS K-5400. The results are shown in Table 1.

| Compounding recipe | |
|---|---|
| Cyclopentadiene resin | 0–55 parts) |
| Chlorinated rubber (CR-20, a product of Asahi Denka Co., Ltd.) | 100–45 |
| Chlorinated paraffin (Chlorinated paraffin-40, a product of Ajinomoto Co., Ltd.) | One-half of the amount of the chlorinated rubber |
| Titanium oxide (Tipaque R-630, a product of Ishihara Sangyo Co., Ltd.) | 100 |
| Epoxidized soybean oil (Adeka Cizer 0-120, a product of Asahi Denka Co., Ltd.) | 10 |
| Xylene | 110 |

Table 1

| Run No. | Comparison 1 | Invention 2 | Invention 3 | Invention 4 | Comparison 5 |
|---|---|---|---|---|---|
| Cyclopentadiene resin (parts) | 0 | 10 | 20 | 30 | 55 |
| Chlorinated rubber | 100 | 90 | 80 | 70 | 45 |
| Chlorinated Paraffin | 50 | 45 | 40 | 35 | 22.5 |
| Drying time (min.) | 45 | 45 | 55 | 45 | 120 |
| Pencil hardness | H | H | F | HB | 3B |
| Flexural resistance (mm φ) | >10 | 6 | 4 | 4 | 4 |
| Adhesion (crosscut test) | 62/100 | 100/100 | 100/100 | 100/100 | 100/100 |
| Erichsen test (mm) | 4 | 8 | 8 | >8 | >8 |
| DuPont impact test (½" × 300 g × cm) | <10 | 15 | 20 | 20 | 20 |
| Water resistance (dipped for 15 days at 40° C.) | no change | no change | no change | no change | no change |
| Corrosion resistance (salt spray at 35° C. for 10 days; rust width, mm) | <1 | <1 | <1 | <1 | <1 |
| Acid resistance (dipped for 14 days in 20% sulfuric acid) | no change | no change | no change | no change | no change |
| Alkali resistance (the time which elapsed until a swelling occurred in 5% sodium hydroxide; hours) | 1 | 5 | 5 | 15 | 15 |

Table 1-continued

| Run No. | Comparison 1 | Invention 2 | Invention 3 | Invention 4 | Comparison 5 |
|---|---|---|---|---|---|
| Gloss (reflectance at 60° on the mirror surface) | 84.6 | 91.5 | 91.0 | 91.2 | 90.4 |

These results demonstrate that the compositions of this invention have improved flexural strength, adhesion, Erichsen value, impact strength, alkali resistance and gloss over the composition not containing the cyclopentadiene resin (Run No. 1), but that when the cyclopentadiene is included in an amount larger than chlorinated rubber (Run No. 5), the drying time, hardness and water resistance are unsatisfactory.

EXAMPLE 2

A mixture of 75 parts of dicyclopentadiene and 25 parts of vinyl acetate was heat polymerized in the presence of xylene at 260° C. for 3 hours to form a cyclopentadiene resin having a softening point of 125° C. The resin was compounded with chlorinated rubber and other ingredients in accordance with the compounding recipe shown below to form a paint composition.

The paint composition was coated, and the properties of the coating were measured in the same way as in Example 1. The results are shown in Table 2.

| Compounding recipe | |
|---|---|
| Cyclopentadiene resin | 0–55 (parts) |
| Chlorinated rubber (CR-20, a product of Asahi Denka Co., Ltd.) | 100–45 |
| Alkyd resin (Beckosol J-535, a product of Dainippon Ink and Chemicals, Inc.) | 50 |
| Chlorinated paraffin (chlorinated Paraffin-40, a product of Ajinomoto Co., Ltd.) | One-half of the amount of the chlorinated rubber |
| Titanium oxide (Tipaque R-630, a product of Ishihara Sangyo Co., Ltd.) | 130 |
| Epoxidized soybean oil (Adeka Cizer 0-120, a product of Asahi Denka Co., Ltd.) | 10 |
| Xylene | 150 |

Table 2

| Run No. | Comparison 6 | Invention 7 | Invention 8 | Invention 9 | Comparison 10 |
|---|---|---|---|---|---|
| Cyclopentadiene resin (parts) | 0 | 10 | 20 | 30 | 55 |
| Chlorinated rubber | 100 | 90 | 80 | 70 | 45 |
| Chlorinated paraffin | 50 | 45 | 40 | 35 | 22.5 |
| Drying time (min.) | 60 | 75 | 60 | 70 | 180 |
| Pencil hardness | H | F | H | HB | 3B |
| Flexural strength (mm $\phi$) | 8 | 2 | 2 | 2 | 2 |
| Adhesion (crosscut test) | 70/100 | 100/100 | 100/100 | 100/100 | 100/100 |
| Erichsen test (mm) | 5 | 8 | 8 | >8 | >8 |
| Du Pont impact test ($\frac{1}{2}''$ × 300 g × cm) | 10 | 50 | 35 | 45 | 70 |
| Water resistance (dipped at 40° C. for 15 days) | no change | no change | no change | no change | no change |
| Corrosion resistance (salt spray at 35° C. for 10 days; rust width, mm) | 1.3 | 1.4 | 1.0 | 1.3 | 1.6 |
| Acid resistance (dipped for 5 days in 20% sulfuric acid) | no change | no change | no change | no change | no change |
| Alkali resistance (the time which elapsed until a swelling occurred in 5% sodium hydroxide; hours) | <1 | 2 | 2 | 2 | 10 |
| Gloss (reflectance at 60° on the mirror surface) | 83 | 88.7 | 89.4 | 90.2 | 92.6 |
| Weatherability (the rate of retention of gloss after exposure for 300 hours to a weatherometer; %) | 54.1 | 58.4 | 55.0 | 54.2 | 33.6 |

It is seen from these results that in the case of a paint comprising an alkyd resin-chlorinated rubber system as a binder, the compositions of this invention have improved flexural strength, adhesion, Erichsen value, impact strength, alkali resistance and gloss over the composition not containing the cyclopentadiene resin, but that when the amount of the cyclopentadiene resin is larger than the chlorinated rubber (Run NO. 10), the drying time, hardness and water resistance are unsatisfactory.

COMPARATIVE EXAMPLE 1

A paint composition was prepared in accordance with the same compounding recipe as in Run No. 8

(Example 2) except that a commercially available petroleum resin, Neopolymer 120 (a product of Nippon oil Chemical Co., Ltd.), was used instead of the cyclopentadiene resin. The properties of the coating from the paint composition were measured. It was found that a period of 11 hours was required for drying the coated film.

COMPARATIVE EXAMPLE 2

A paint composition was prepared in the same way as in Run No. 8 (Example 2) except that a commercially available coumarone resin, V-120 (a product of Nittetsu Chemical Industry Co., Ltd.), was used instead of the cyclopentadiene resin. The properties of the coating from the paint composition were measured. It was found that a period of 5 hours and 45 minutes was required for drying the coated film, and the Erichsen value was only 1.2 mm.

| Compounding recipe | |
|---|---|
| Cyclopentadiene resin | 0–55 (parts) |
| Chlorinated polyethylene (Adekaprene CE-505, a product of Asahi Denka Co., Ltd.) | 100–45 |
| Chlorinated paraffin (Chlorinated paraffin-65, a product of Ajinomoto Co., Ltd.) | 75 |
| Titanium oxide (Tipaque R-550, a product of Ishihara Sangyo Co., Ltd.) | 120 |
| Epoxidized soybean oil (Adeka Cizer 0-120, a product of Asahi Denka Co., Ltd.) | 5.5 |
| Xylene | 150 |

Table 3

| Run No. | Comparison 11 | Invention 12 | Invention 13 | Comparison 14 |
|---|---|---|---|---|
| Cyclopentadiene resin (parts) | 0 | 10 | 30 | 55 |
| Chlorinated polyethylene | 100 | 90 | 70 | 45 |
| Thickness of the coated film ($\mu$m) | 49 | 50 | 47 | 51 |
| Pencil hardness | 4B | 4B | 4B | 6B |
| Adhesion (crosscut test) | 55/100 | 90/100 | 90/100 | 100/100 |
| Erichsen test (mm) | 6 | >8 | >8 | 6 |
| Flexural strength (mm $\phi$) | 2 | 2 | 2 | 4 |
| Du Pont impact strength ($\frac{1}{2}$" × 300 g × cm) | 10 | 25 | 35 | 30 |
| Water resistance (dipped at 40° C. for 15 days | no change | no change | no change | no change |
| Alkali resistance (the number of days which elapsed until a swelling occurred in 5% sodium hydroxide) | 2 | 11 | 15 | >15 |
| Acid resistance (the number of days which elapsed until a swelling occurred in 20% sulfuric acid) | 8 | 8 | 8 | 8 |
| Corrosion resistance (salt spray at 35° C. for 500 hours; rust width, mm) | 1 | 1 | 1 | 1 |
| Weatherability (the ratio of retention of gloss after exposure for 300 hours to a weatherometer) | 75 | 77 | 80 | 76 |

EXAMPLE 3

A monomeric mixture consisting of 70 parts of dicyclopentadiene and 30 parts of isoprene was heat polymerized in the presence of xylene at 260° C. for 3 hours to form a cyclopentadiene resin having a softening point of 125° C.

The resulting cyclopentadiene resin was compounded with chlorinated polyethylene (having a chlorine content of 63% by weight and a viscosity, determined for a toluene solution in a concentration of 40% by weight at 25° C., of 100 centipoises) and other ingredients indicated in accordance with the following compounding recipe.

The paint composition obtained was coated, and the properties of the coating were measured in the same way as in Example 1. The results are shown in Table 3.

The results demonstrate that the compositions of this invention had improved adhesion, Erichsen value, impact strength and alkali resistance over the composition not containing the cyclopentadiene resin (Run No. 11), but that when the amount of the cyclopentadiene resin was larger than the chlorinated polyethylene (Run No. 14), the hardness, Erichsen value and flexural strength were unsatisfactory.

EXAMPLE 4

A monomeric mixture consisting of 75 parts of dicyclopentadiene and 25 parts of vinyl acetate was heat polymerized in the presence of xylene at 260° C. for 3 hours to form a cyclopentadiene resin having a softening point of 125° C.

The resulting cyclopentadiene resin was compounded with chlorinated polypropylene (having a chlorine content of 63% by weight, and a viscosity, determined for a toluene solution in a concentration of 40% by weight at 25° C., of 40 centipoises) and other ingredients indicated in accordance with the following compounding recipe. The resulting paint composition was coated, and the properties of the coated film were measured in the same way as in Example 1. The results are shown in Table 4.

| Compounding recipe | |
|---|---|
| Cyclopentadiene resin | 0–55 (parts) |
| Chlorinated polypropylene (Adekaprene CP-100, a product of Asahi Denka Co., Ltd.) | 100–45 |
| Chlorinated paraffin (Chlorinated Paraffin-65, a product of Ajinomoto Co., Ltd.) | 75 |
| Titanium oxide (Tipaque R-550, a product of Ishihara Sangyo Co., Ltd.) | 120 |
| Epoxidized soybean oil (Adeka Cizer 0-120, a product of Asahi Denka Co., Ltd.) | 5.5 |
| Xylene | 150 |

Table 4

| | Comparison | Invention | | Comparison |
|---|---|---|---|---|
| Run No. | 15 | 16 | 17 | 18 |
| Cyclopentadiene resin (parts) | 0 | 15 | 30 | 55 |
| Chlorinated polypropylene | 100 | 85 | 70 | 45 |
| Thickness of the coated film (μm) | 45 | 44 | 49 | 47 |
| Pencil hardness | 4B | 4B | 4B | 6B |
| Adhesion (crosscut test) | 80/100 | 100/100 | 100/100 | 50/100 |
| Erichsen test (mm) | 6 | >8 | >8 | 2 |
| Flexural strength (mm φ) | 2 | 2 | 2 | 2 |
| Du Pont impact strength (½" × 300 g × cm) | 15 | 30 | 30 | 15 |
| Water resistance (dipped at 40° C. for 1 month) | no change | no change | no change | no change |
| Alkali resistance (the number of days which elapsed until a swelling occurred in 5% sodium hydroxide) | 1 | 3 | 3 | 3 |
| Acid resistance (the number of days which elapsed until a swelling occurred in 20% sulfuric acid) | 3 | 3 | 3 | 3 |
| Corrosion resistance (salt spray at 35° C. for 500 hours; rust width, mm) | 1.5 | 1.5 | 1.5 | 1.5 |

These results demonstrate that the compositions of this invention had improved adhesion, Erichsen value, impact strength and alkali resistance over the composition not containing the cyclopentadiene resin (Run No. 15), but that when the amount of the cyclopentadiene resin was larger than that of the chlorinated polypropylene (Run No. 18), the hardness, adhesion, Erichsen value and impact strength were unsatisfactory.

What I claim is:

1. An air drying paint composition comprising a chlorinated polymer selected from the group consisting of chlorinated polyisoprene, chlorinated polybutadiene, chlorinated polyethylene and chlorinated polypropylene as at least one ingredient of a binder, said composition further comprising 5 to 100 parts by weight, per 100 parts by weight of the chlorinated polymer, of a cyclopentadiene resin having a softening point of 50° to 160° C. prepared by heat polymerization of 50 to 100% by weight of a cyclopentadiene monomer and 50 to 0% by weight of a comonomer copolymerizable with it.

2. The composition of claim 1 wherein the content of the chlorinated polymer is at least 20% by weight based on the entire binder.

3. The composition of claim 1 wherein the chlorinated polymer contains at least 55% by weight of chlorine and has a viscosity, determined for its toluene solution in a concentration of 40% by weight at 25° C., of 20 to 10,000 centipoises.

4. The composition of claim 1 wherein the cyclopentadiene monomer is selected from the group consisting of cyclopentadiene, cyclopentadiene dimer, cyclopentadiene trimer, alkylcyclopentadiene trimer, and a codimer of cyclopentadiene and alkylcyclopentadiene.

5. The composition of claim 1 wherein the comonomer is a diolefinic monomer, a monolefinic monomer or a polar vinyl monomer.

6. The composition of claim 1 wherein the content of the chlorinated polymer is at least 30% by weight based on the entire binder.

7. The composition of claim 1 wherein the amount of the cyclopentadiene resin is from 10 to 50 parts by weight, per 100 parts by weight of the chlorinated polymer.

8. The composition of claim 1 wherein the chlorinated polymer is the only binder ingredient.

* * * * *

UNITED STATES PATENT AND TRADEMARK OFFICE
CERTIFICATE OF CORRECTION

PATENT NO. : 4,220,737
DATED : September 2, 1980
INVENTOR(S) : Ryuji Kita

It is certified that error appears in the above—identified patent and that said Letters Patent is hereby corrected as shown below:

ASSIGNEE:

delete "Zion" and substitute -- Zeon --

Signed and Sealed this

Twenty-fifth Day of November 1980

[SEAL]

*Attest:*

SIDNEY A. DIAMOND

*Attesting Officer*     *Commissioner of Patents and Trademarks*